United States Patent [19]
Nimura et al.

[11] Patent Number: 5,371,497
[45] Date of Patent: Dec. 6, 1994

[54] NAVIGATION SYSTEM FOR VEHICLES

[75] Inventors: Mitsuhiro Nimura, Okazaki; Akimasa Nanba, Chiryu; Hiroyoshi Masuda, Nagoya; Hiroshi Kishi, Toyota; Toru Ito, Nagoya, all of Japan

[73] Assignee: Aisin AW Co., Ltd., Anjo, Japan

[21] Appl. No.: 102,251

[22] Filed: Aug. 5, 1993

[30] Foreign Application Priority Data

Aug. 19, 1992 [JP] Japan .................. 4-220119

[51] Int. Cl.5 ............................... G08G 1/123
[52] U.S. Cl. .................... 340/995; 340/990; 364/449
[58] Field of Search ............ 340/995, 990, 988; 364/449; 73/178 R

[56] References Cited

U.S. PATENT DOCUMENTS

| | | | |
|---|---|---|---|
| 4,763,270 | 8/1988 | Itoh et al. | 340/995 |
| 4,984,168 | 1/1991 | Neukrichner et al. | 340/995 |
| 4,992,947 | 2/1991 | Nimura et al. | 340/995 |
| 5,121,326 | 6/1992 | Moroto et al. | 340/995 |
| 5,184,123 | 2/1993 | Bremer et al. | 340/995 |

FOREIGN PATENT DOCUMENTS

| | | |
|---|---|---|
| 0151713 | 7/1987 | Japan .................. 340/995 |
| 62-267900 | 11/1987 | Japan . |
| 1173815 | 7/1989 | Japan . |
| 1173817 | 7/1989 | Japan . |
| 1173819 | 7/1989 | Japan . |
| 2-4285 | 1/1990 | Japan . |
| 2103584 | 4/1990 | Japan . |
| 3137679 | 6/1991 | Japan . |
| 3269317 | 11/1991 | Japan . |

Primary Examiner—Brent Swarthout
Attorney, Agent, or Firm—Cushman, Darby & Cushman

[57] ABSTRACT

A navigation system for vehicles, capable of exactly and quickly showing guide information to a driver when two intersections to be negotiated are close to each other, is provided. A destination is input by an input part and a route to the destination is calculated from a present position of a vehicle, calculated by a present position determiner, by a route calculator included in a calculation section. The calculated route is stored in a route memory. A route guide controller included in the calculation section reads map information around the vehicle, stored in a guide information memory within a map information storage section and superimposes the map information with the present position of the vehicle, a traveling direction and the route stored in the route memory to display the superimposed information on a display. When the vehicle approaches the intersection, the screen is changed with an intersection map, but, when a next intersection map is required, the next intersection map is drawn on the back screen and is displayed by changing the two screens after the vehicle passes through the first intersection.

10 Claims, 3 Drawing Sheets

NAVIGATION SYSTEM FOR VEHICLES

BACKGROUND OF THE INVENTION i) Field of the Invention

The present invention relates to a navigation system for vehicles, and more particularly to a mutual screen change between a block guide map and an intersection guide map in a navigation system for vehicles.

ii) Description of the Related Art

Conventionally, in order to reduce a driver's load, various devices have been developed and mounted on a vehicle. A navigation system for guiding a vehicle to a destination along a route has been proposed.

In such a navigation system, the destination is input and a guide start switch is operated to search for a route to the destination from the present position. The route obtained in the search is displayed so that it can be shown to the driver. Further, the navigation system has another function for detecting the present position of the vehicle and during the driving, the route obtained in the search and the detected present position are displayed to carry out navigation of the vehicle.

When the vehicle reaches an intersection to be negotiated, the screen is changed from a block guide map to an intersection guide map, and after turning to the left or right, the screen is changed again to the block guide map from the intersection guide map to display and guide along the route.

However, in the conventional navigation system, when it is determined that the vehicle is approaching an intersection to be negotiated while the block guide map is displayed on the screen, the screen is changed from the block guide map to the intersection guide map. In particular, when there is another intersection to be negotiated in the vicinity of the previous intersection while the intersection guide map is displayed on the screen, it is often too late to change the screen from the previous intersection guide map to a new intersection guide map after it is discriminated that the vehicle is approaching another intersection to be negotiated and it is impossible to exactly and quickly show the information of the new intersection to the driver.

SUMMARY OF THE INVENTION

Accordingly, it is an object of the present invention to provide a navigation system for vehicles in view of the aforementioned problems of the prior art, which is capable of providing driving guidance information to a driver in an exact and quick manner in any situation.

In order to achieve the above-described object, a navigation system for vehicles according to the present invention comprises present position detecting means for detecting a present position of a vehicle; map information storage means for storing map information; route calculating means for searching a route to a destination by using the map information stored in the map information storage means; display means having at least first and second display screens; drawing control means for drawing and displaying the route calculated superimposed on the map information on the first display screen and drawing a next route on the second display screen in advance; and display change means for changing the first and the second display screens depending on the detected present position of the vehicle.

The drawing control means draws a next intersection guide map on the second display screen when a distance between the two intersections is at most a predetermined distance.

The display change means changes the first display screen and the second display screen and displays the next intersection guide map in place of a presently displayed intersection guide map when a distance from the present position of the vehicle to the next intersection is at most a predetermined distance.

As described above, according to the present invention, the display means is provided with at least two screens such as the first and the second screens. One guide map to be presently displayed is displayed on the first screen and another guide map to be displayed next is displayed on the second screen. Hence, when the two intersections to be negotiated are positioned in close proximity to each other, since the next intersection guide map is drawn on the second screen, by simply changing the first and the second screens, the next intersection guide map can be exactly and quickly supplied to the driver.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

The present invention will now be described in connection with its preferred embodiment with reference to the accompanying drawings.

Figure 1:
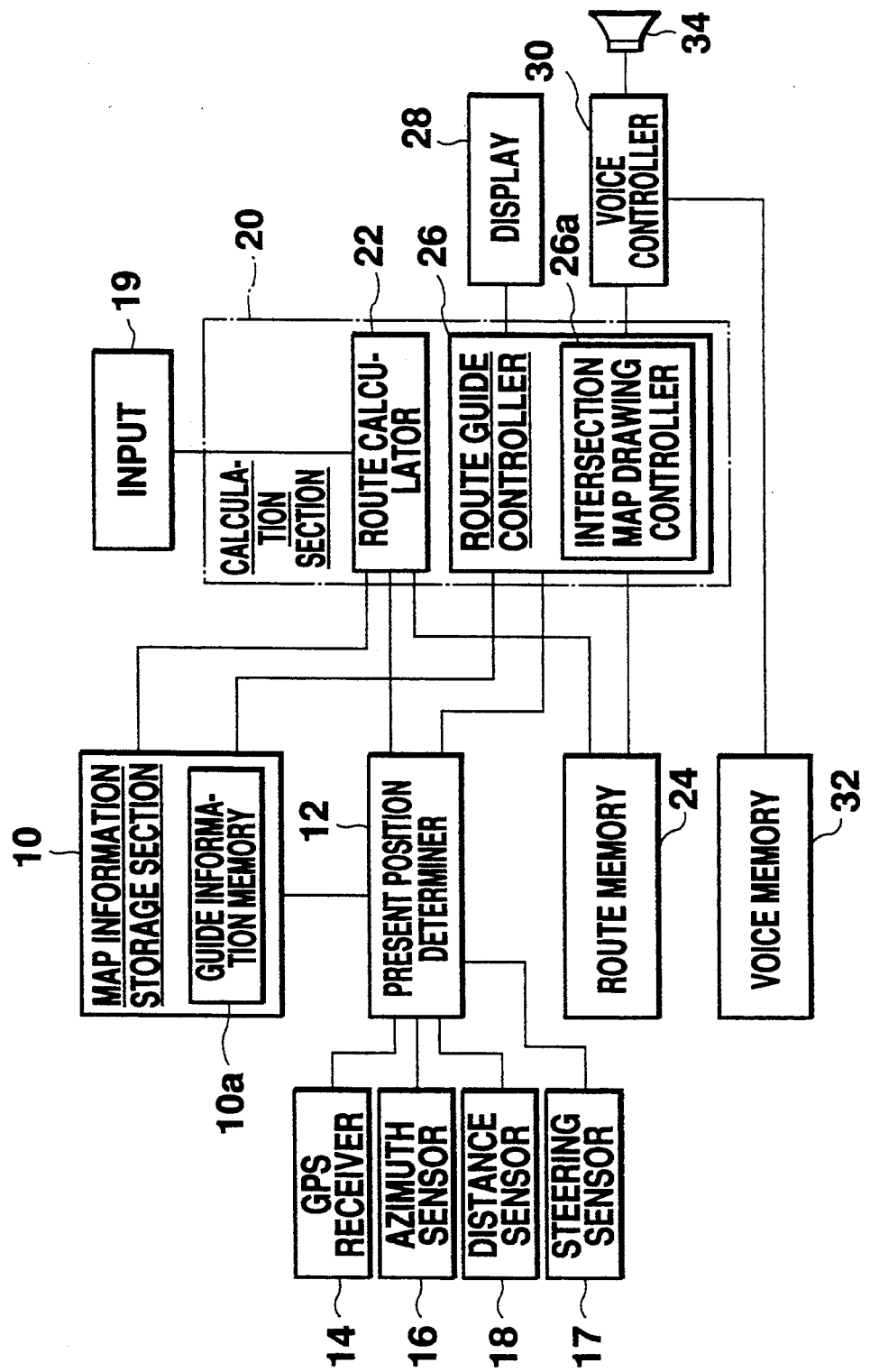
FIG. 1 is a block diagram of one embodiment of a navigation system for vehicles according to the present invention.

In FIG. 1, there is shown one embodiment of a navigation system for vehicles according to the present invention. As shown in FIG. 1, in the vehicle navigation system, there is provided a map information storage section 10 having a guidance information memory 10a, for storing map information of roads, place names including intersection names, building names, river names and the like. The map information can be adapted to be read out of the map information storage section 10 as needed. The vehicle navigation system also includes a GPS (global positioning system) receiver 14 utilizing the GPS for detecting a present position of a vehicle, an azimuth sensor 16 for detecting a traveling azimuth of the vehicle based on the earth's magnetism, and a distance sensor 18 for detecting the traveling distance of the vehicle from the number of revolutions of the wheel, and on the basis of the detection result of these sensors, a present position determiner 12 determines the present position of the vehicle. Further, the navigation system includes a steering sensor 17 for detecting a revolution angle of the steering. The information from the steering sensor 17 is input to the present position determiner 12 for use in map matching so as to correct the present position of the vehicle to an intersection position on the map at the left- or right-hand turn.

The vehicle navigation system also includes an input part 19, a calculation section 20 having a route calculator 22 and a route guide controller 26, a route memory 24, a display 28, a voice controller 30, a voice memory 32 and a speaker 34. The route guide controller 26 includes an intersection map drawing controller 26a.

When navigation of a vehicle to a destination is executed, the destination is indicated on a screen of the display 28 or is input by a place name or the like from the input part 19, and a route to the destination is calculated by the route calculator 22 of the calculation section 20 on the basis of the present position calculated in the present position determiner 12. The calculated route is stored into the route memory 24. In this case, for this route calculation, an appropriate route search method is used.

After the input of the destination and the calculation of the route, actual navigation is performed. That is, the guidance start switch of the input part 19 is operated and the route guide controller 26 of the calculation section 20 reads the map information around the vehicle out of the guide information memory 10a of the map information storage section 10 to display the present position of the vehicle, the traveling direction and the route stored in the route memory 24 in a superimposed manner on the display 28.

The display 28 is mounted within an instrument panel near a driver's seat and the driver looks at the display 28 to confirm the position of the vehicle and to get the information about the future route. As a display example, the selected route is indicated by a thick line and the other lines are shown by thin lines. Also, the position of the vehicle can be shown by a circle and the traveling direction can be shown by a wedge-shaped arrow.

Now, when the vehicle approaches an intersection for a course change, the display screen is changed to display an intersection name and a distance to the intersection. Also, with this display, in order to generate the voice corresponding to the navigation at the intersection, the route guide controller 26 makes an instruction to the voice controller 30. Then, the voice controller 30 reads the information as digital data out of the voice memory 32 and converts the digital data into analog signals to send the analog signals to the speaker 34 for driving the same. Thus, the speaker 34 outputs a route indication such as "turn to the left at a next intersection approximately 300 m ahead" to the driver so as to carry out the navigation. This voice indication is executed every predetermined distance until passing through the intersection. For example, when the vehicle travels on a road having at least two lanes, the voice indication is carried out at 700 m for the first time, at 300 m for the second time and at 100 m for the third or the last time before the intersection. This information voice is stored in the voice memory 32, every phrase being stored as digital data. Hence, when the information voice is output, a plurality of phrases are read out to compose a sentence and the speaker 34 outputs the sentence as the signal for the information. Also, the output timing of the information voice is detected by the route guide controller 26 and the voice controller 30 executes the processing of the signals for the voice output.

As described above, in this embodiment, when the vehicle approaches the intersection to be negotiated, the screen is changed from the block guide map to the intersection guide map to perform the navigation system. However, when the intersections to be negotiated are present in close proximity to each other, by the usual drawing of the intersection guide map for every approach to each intersection, too late a drawing of the intersection guide map can be caused. Accordingly, in this embodiment, the display 28 is provided with two display screens such as the first and the second screens or the surface and the back screens. Hence, the intersection map drawing controller 26a of the route guide controller 26 within the calculation section 20 draws the next intersection guide map on the second or back screen in advance and, when the vehicle approaches the next intersection, the first and the second screens are switched to display the maps.

Figure 2:
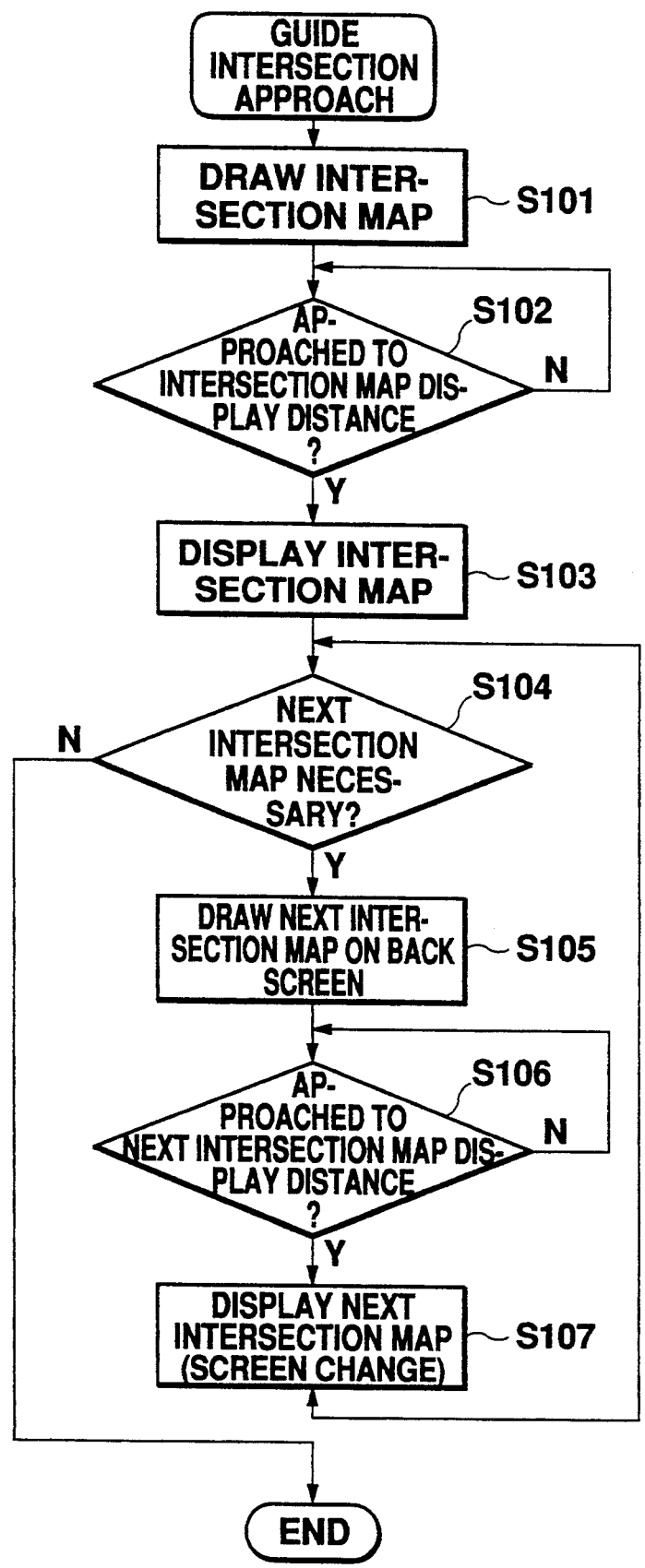
FIG. 2 is a flow chart showing an operation of the navigation system shown in FIG. 1.

Next, the operation of the intersection map drawing controller 26a of the route guide controller 26 will now be described in detail with reference to the flow chart shown in FIG. 2.

Figure 3:
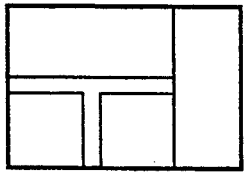
FIG. 3 is a schematic view showing examples of a screen change display between the first and second map drawing screens for use in the navigation system shown in FIG. 1.

First, when an approach to a guide intersection is detected by a comparison between a present position of a vehicle and a route, an intersection guide map is drawn on the first (surface) screen of the display 28 in step S101. In this case, as to the intersection guide map, a drawing as shown in FIG. 3 is used, as proposed in Japanese Patent Application No. Hei 4-195777 which was laid open as publication No. 6-44490. Then, it is determined whether or not the vehicle approaches within a predetermined intersection map display distance (for example, 100 m) in step S102. When it is discriminated that the vehicle is within the predetermined intersection map display distance, the intersection guide map drawn in step S101 is displayed on the first screen of the display 28 in place of a block guide map in step S103.

Next, it is determined whether or not a drawing of a next intersection guide map is required in step S104. This determination is carried out depending on whether or not the next intersection to be negotiated is close to the previous intersection to be negotiated, that is, whether or not the distance between the adjacent two intersections to be negotiated is at most a predetermined distance. When it is determined that the two intersections are close to each other, a next intersection guide map is drawn on the second (back) screen of the display 28 in step S105. The drawing of the intersection guide map is executed on the basis of the data stored in the route memory 24 and the data stored in the map information storage section 10. After finishing the drawing of the next intersection guide map on the back screen, it is determined again whether or not the vehicle approaches the predetermined next intersection map display distance in step S106. When it is determined that the vehicle approaches the next intersection, the first and the second screens are changed with each other and the intersection guide map drawn on the second (back) screen is displayed in place of the presently displayed intersection in step S107. Then, the procedure is returned to step S104 and the aforementioned steps are repeated until no next intersection guide map is required in step S104.

FIG. 3 illustrates drawing examples of the first and the second (back) screens. In FIG. 3(A) to (F), the left hand side is the first screen and the right hand side is the second (back) screen. First, FIG. 3(A) shows the case that the vehicle approaches the guide intersection, and the processing in the step S101, that is, the intersection guide map drawing is executed on the first screen. Then, when the vehicle approaches the predetermined intersection map display distance in step S102, the drawing in FIG. 3(A) is changed by the display on the first screen shown in FIG. 3(B) in step S103. Next, when the two intersections to be negotiated are close to each other, it is determined that the next intersection guide map is required in step S104, the drawing of the next intersection guide map on the second (back) screen (the right side) is started in step S105, as shown in FIG. 3(c).

After passing through the first intersection, when the vehicle approaches the next intersection in step S106, as shown in FIG. 3(D), time first and the second screens are exchanged with each other and the second intersection guide map drawn on the second screen is displayed in step S107. Further, when a third intersection to be negotiated is required in step S104, while the intersection guide map of the second screen is displayed, as shown in FIG. 3(E), a third intersection guide map is drawn on the first screen in step S105. Next, after passing through the second intersection, when the vehicle approaches the predetermined third intersection map display distance in step S106, the first and the second screens are exchanged with each other again in step S107 and, as shown in FIG. 3(F), the third intersection guide map drawn on the first screen is displayed in step S107.

As described above, in this embodiment, the display 28 is provided with the first and the second screens and, while one intersection guide map is displayed on one screen, a next intersection guide map is drawn on the other screen. The first and the second screens are appropriately changed with each other and the next guide map is displayed. As a result, even when the intersections to be negotiated are positioned in close proximity to each other, the guide maps can be exactly and quickly supplied to the driver.

As described above, according to the present invention, in the navigation system for vehicles, even when the two intersections to be negotiated are positioned in close proximity to each other, the guide information for driving can be exactly and quickly supplied to the driver.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A navigation system for vehicles, comprising:
    (a) present position detecting means for detecting a present position of a vehicle;
    (b) map information storage means for storing map information;
    (c) route calculating means for searching a route to a destination by using the map information stored in the map information storage means;
    (d) display means having at least first and second display screens;
    (e) drawing control means for drawing a guide map of a next stage of the route on one of the first or second display screens while displaying a guide map of a present stage of the route on the other of the first or second display screens; and
    (f) display change means for changing the first and the second display screens to display guide maps of the route on the first and second display screens alternately on the basis of the detected present position, thereby, after displaying the guide map of the present stage of the route on the first display screen, displaying the guide map of the next stage of the route on the second screen drawn by the drawing control means while the guide map displayed on the first screen remains unchanged, and then after finishing the drawing of the display of the second screen, displaying on the first screen a guide map of a subsequent stage of the route on the first screen drawn by the drawing control means while the guide map displayed on the second screen remains unchanged.

2. The navigation system of claim 1, wherein the drawing control means draws the guide map of the next stage of the route on either of the first or second display screen of the display means when a distance between an intersection and a next intersection is at most a predetermined distance.

3. The navigation system of claim 2, wherein the display change means alternately changes the first display screen and the second display screen and displays the guide map of the subsequent stage of the route when a distance from the present position of the vehicle to a subsequent intersection is at most a predetermined distance.

4. The navigation system of claim 1, wherein the present position detecting means comprises:
    a global position system receiver to detect a present position of the vehicle;
    an azimuth sensor to detect a traveling azimuth of the vehicle;
    a distance sensor to detect a traveling distance of the vehicle from a number of revolutions of a wheel of the vehicle; and
    a present position determiner unit connected to the global position system receiver, the azimuth sensor, and the distance sensor, to determine the present position of the vehicle.

5. A navigation system for vehicles, comprising:
    (a) a global positioning system to detect a present position of a vehicle;
    (b) a guidance information memory for storing map information;
    (c) a route calculator to search a route to a destination by using the map information stored in the guidance information memory;
    (d) a display area having a first and a second display screen;
    (e) an intersection map drawing controller to draw a guide map of a next stage of the route on one of the first or second display screens while displaying a guide map of a present stage of the route on the other of the first or second display screens; and
    (f) a route guide controller to change the first and the second display screens to display guide maps of the route on the first and second display screens alternately on the basis of the detected present position, thereby, after displaying the guide map of the present stage of the route on the first display screen, displaying the guide map of the next stage of the route on the second screen drawn by the intersection map drawing controller while the guide map displayed on the first screen remains unchanged, and then after finishing the drawing of the display of the second screen, displaying on the first screen a guide map of a subsequent stage of the route on the first screen drawn by the intersection map drawing controller while the guide map displayed on the second screen remains unchanged.

6. The navigation system of claim 5, wherein the intersection map drawing controller draws the guide map of the next stage of the route on either of the first or second display screen when a distance between an intersection and a next intersection is at most a predetermined distance.

7. The navigation system of claim 6, wherein the route guide controller alternately changes a displayed guide map on the first display screen to the second display screen and displays the guide map of the subsequent stage of the route on the first display screen when a distance from the present position of the vehicle to a subsequent intersection is at most a predetermined distance.

8. The navigation system of claim 5, further comprising:
   an azimuth sensor to detect a traveling azimuth of the vehicle; and
   a distance sensor to detect a traveling distance of the vehicle from a number of revolutions of a wheel of the vehicle.

9. The navigation system of claim 8, further comprising a global position system receiver to detect a present position of the vehicle.

10. The navigation system of claim 9, further comprising a present position determiner unit connected to the global position system receiver, the azimuth sensor, and the distance sensor, to determine the present position of the vehicle.

* * * * *